(12) United States Patent
France et al.

(10) Patent No.: US 6,212,475 B1
(45) Date of Patent: Apr. 3, 2001

(54) METHOD AND APPARATUS FOR AUTOMATED DIFFERENT GPS PROCESSING

(75) Inventors: Peter Glen France, Christchurch (NZ); Paul D. Perreault, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/337,567

(22) Filed: Jun. 22, 1999

Related U.S. Application Data

(63) Continuation of application No. 08/702,761, filed on Aug. 22, 1996, now Pat. No. 5,928,306.

(51) Int. Cl.⁷ .................................................... G01S 5/02
(52) U.S. Cl. ...................... 701/214; 701/215; 701/213; 701/207; 342/451; 342/357
(58) Field of Search .................................. 701/215, 207, 701/300, 213, 214; 342/451, 357

(56) References Cited

U.S. PATENT DOCUMENTS 5,345,244    9/1994    Gildea et al. .
5,432,841    7/1995    Rimer .
5,563,607 *  10/1996   Loomis et al. ........................ 342/357
5,638,077    6/1997    Martin .
5,717,406    2/1998    Sanderford et al. .
5,717,737    2/1998    Doviak et al. .
5,724,316    3/1998    Brunts .
5,777,580    7/1998    Janky et al. .

* cited by examiner

*Primary Examiner*—William A. Cuchlinski, Jr.
*Assistant Examiner*—Arthur Donnelly
(74) *Attorney, Agent, or Firm*—Blakely, Sokoloff, Taylor & Zafman LLP (57) ABSTRACT

GPS position information is collected and stored in a computer system. The GPS position information includes time-stamps that indicates when the GPS position information was collected. The computer system uses the time stamps to generate an error correction file name for an error correction file that can be used to correct the GPS position information. Using the generated error correction file name, the computer system connects to a file server that stores differential GPS error correction files and copies the needed differential GPS error correction file. The computer system connects to the DGPS file server using the File Transfer Protocol of the global Internet. The computer system then corrects the GPS position information in the computer system using the retrieved DGPS error correction file

13 Claims, 7 Drawing Sheets

FIG. 6

METHOD AND APPARATUS FOR AUTOMATED DIFFERENT GPS PROCESSING

This application is a CON of U.S. Ser. No. 08/702,761 filed Aug. 22, 1996 now U.S. Pat. No. 5,928,306.

FIELD OF THE INVENTION

The present invention relates to the field of Global Positioning Systems (GPS). In particular, the present invention discloses methods of locating, transmitting and applying differential GPS correction data.

BACKGROUND OF THE INVENTION

Global Positioning Systems (GPS) are Satellite-based radio positioning systems that provide three-dimensional position and time information to a user with the proper equipment located anywhere on the surface of the Earth. The NAVSTAR GPS system, operated by the U.S. Department of Defense, is the first GPS system widely available to civilian users.

GPS receivers often yield inaccurate positioning results due to errors that enter the system. Most of the errors are "common errors". Common errors are errors that are experienced by all the GPS receivers in a local area. Common errors include clock deviation, satellite orbit drift, selective availability, and changing radio propagation conditions in the ionosphere.

To improve the accuracy of GPS receivers, differential GPS (DGPS) was created. Differential GPS (DGPS) operates by eliminating known errors in a GPS receiver to make the results more accurate. Specifically, a GPS receiver is placed at location for which the position coordinates are accurately known and accepted. This GPS receiver at an accurately known location is called a "base station". The base station calculates the difference between the known coordinates and the GPS receiver calculated coordinates to determine the common error introduced to all GPS receivers in the local area. The common error information is referred to as error correction data. The error correction data determined by the base station can be applied to other moveable GPS receivers (known as rovers) in the local area to improve the accuracy of the rover GPS receivers.

The sources of common error are continuously changing. Thus, it is necessary to match the error correction data from the base station very closely in time to the data from the roving GPS receivers. One method of matching the data is to transmit the error correction data from the base station directly to the roving GPS receiver such that the error correction is performed immediately in the rover GPS receiver. This technique is known as real-time DGPS.

Another method of matching the error correction data with the rover position data is to record both the error correction data of the base station and the position data of the rover receiver with time-stamps. The two time-stamped data sets can then be processed together at a later time by matching the time-stamps. This technique is known as post processing.

With the post processing technique, both the base station and the rover record data simultaneously and store the data into time-stamped files. The time-stamped files must later be matched. If there is more than one base station, then the error correction files from the nearest base station must be used for the most accurate results. The process of identifying the proper time-stamped error correction files from the nearest base station is time-consuming task that is error prone. It would therefore be desirable to have an improved method of identifying the error correction files needed for differential GPS post processing.

SUMMARY AND OBJECTS OF THE INVENTION

A computer automated differential GPS position information method is disclosed. GPS position information is collected by a rover GPS unit and stored in a computer system. The GPS position information includes time-stamps that indicate when the GPS position information was collected. The computer system uses the time stamps to generate an error correction file name for an error correction file that can be used to correct the rover GPS position information. The computer system then connects to a file server that has a set of differential GPS error correction files generated by a base station. In one possible embodiment, the computer system connects to the DGPS file server using the File Transfer Protocol (FTP) of the global Internet. Using the generated error correction file name, the computer system copies the needed differential GPS error correction file. The computer system then corrects the GPS position information in the computer system using the retrieved DGPS error correction file Other objects, features, and advantages of the present invention will be apparent from the accompanying drawings and from the detailed description which follows below.

BRIEF DESCRIPTION OF THE DRAWINGS

The objects, features and advantages of the present invention will be apparent to one skilled in the art, in view of the following detailed description in which.

DETAILED DESCRIPTION

A method and apparatus for delivering differential GPS information is disclosed. In the following description, for purposes of explanation, specific nomenclature is set forth to provide a thorough understanding of the present invention.

However, it will be apparent to one skilled in the art that these specific details are not required in order to practice the present invention. For example, the present invention has been described with reference to the global Internet. However, the same techniques can easily be applied to other types of computer networks. Furthermore, the present invention is disclosed with reference to the File Transfer Protocol (FTP) and the Hyper-Text Transfer Protocol (HTTP), however other computer communication protocols can easily be used to implement the teachings of the present invention.

Differential GPS

Figure 1:
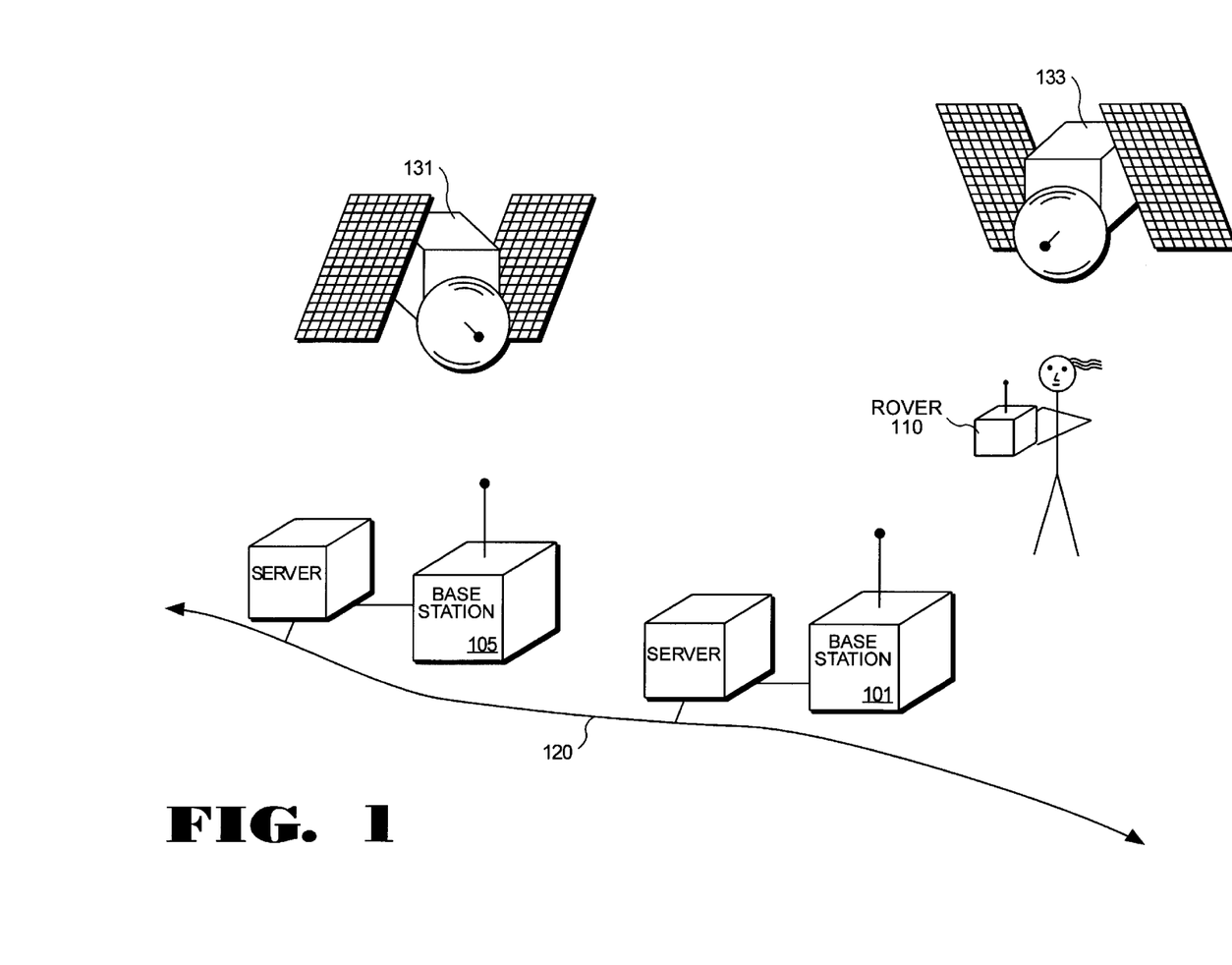
FIG. 1 illustrates a rover GPS unit being used to collect position data and two base stations being used to collect differential GPS error correction information.

FIG. 1 illustrates an example of a differential Global Positioning System (DGPS) in use. In FIG. 1, there is a handheld rover GPS unit 110 that is carried by a person for remote positioning. The handheld rover GPS unit 110 receives information from a plurality of GPS satellites such as GPS satellite 131 and GPS satellite 133. From the information received from the GPS satellites, the handheld rover GPS unit 110 determines its position.

Also illustrated in FIG. 1 are base station 101 and base station 105. The two base stations 101 and 105 also receive the GPS information from the GPS satellites 131 and 133. The position of the each base station is accurately known. The base stations 101 and 105 use their known positions to calculate a common error in the GPS information received from satellites 131 and 133. This common error differential is stored as an error correction file in a file server associated with the base station.

To improve the accuracy of the position information collected by the handheld rover GPS unit 110, a user can apply the error correction information from the nearest base station to the position information collected by the handheld rover GPS unit 110. Using a post processing technique, time-stamped GPS position information collected at particular time by the handheld rover GPS unit 110 is matched to a time-stamped error correction file generated by a base station at the same time. The process of manually identifying and fetching the proper error correction files from the nearest base station is a time-consuming difficult task. Since the task of identifying and fetching the proper error correction files is nontrivial, the wrong error correction files may be selected. Thus it would be desirable to automate this task.

Automated DGPS Correction File Selection

To simplify the task of selecting the proper DGPS error correction file, the present invention introduces an automated method that selects the proper DGPS error correction file. The automated system is normally implemented as an auto-selection program on a personal computer system. Three different methods of implementing an auto-selection program are disclosed.

DGPS file name generation embodiment

In a first embodiment of an auto-selection program, the auto-selection program of the present invention first examines all the uncorrected GPS files for start and end times. Using the start and end times, the auto-selection program determines the time spans needed for error correction. Once the time spans needed for error correction have been determined, the time is transformed into Universal time. Finally, the auto-selection program generates one or more coded file names that should contain the needed DGPS error correction information.

In one embodiment, the DGPS error correction data files are each stored for one hour increments, thus there are 24 error correction files generated each day. The file name of each error correction file identifies the time span for which the error correction file is valid. Specifically, the file name is in the form YYMMDDHH.SSF where the first two characters of the file name (YY) identify the year; the next two characters (MM) identify the month; the next two characters (DD) identify the day; and, the last two characters (HH) identify the hour for which the correction data begins. In one embodiment, the first numeral is replaced with a letter prefix. A three letter suffix added to the file name may be used to identify a file as a DGPS error correction file. Several different suffixes can be used to identify DGPS error correction files. For example, Trimble Navigation of Sunnyvale, Calif. commonly uses the suffixes "SSF" and "DAT." Other formats include the industry standard RINEX file format that uses the suffixes "OBS" and "NAV." It would also be possible to store error correction information in files compressed with the popular PKZIP program such that the compressed files would have the "ZIP" suffix.

To best illustrate the file name embodiment, an example will be provided. Take the case of a user in New Zealand that collected half an hour of GPS data starting at 10:20 a.m. on Mar. 27, 1996. The first step would be to transform the New Zealand time into Universal time. This is performed by subtracting 12 hours to obtain the sample time of 10:20 p.m. on Mar. 26, 1996 Universal time. To identify the proper data file name for an error correction file for Mar. 26, 1996 at 10:20 p.m. Universal time, the file name "96032622.SSF" would be used. In the file name "96032622.SSF" the "96" identifies the year, the "03" identifies the month (March), the "26" identifies the day, and the "22" identifies the hour (in a 24-hour format) for which the error correction data is valid. Finally, the three letter suffix of "SSF" identifies the file as a DGPS error correction file. As stated earlier, the first numeral may be replaced with a letter prefix. For example, the first numeral "9" may be replaced with a letter prefix "B" such that the file name would be "B6032622.SSF".

DGPS file scan embodiment

In a second embodiment of an auto-selection program, the auto-selection program also examines all the uncorrected GPS files for start and end times to determine the time spans needed for correction. Then, the auto-selection program examines all the files in a local directory containing a set of DGPS error correction files to determine their start and end times. In one embodiment, the auto-selection program recursively examines all subdirectories. By comparing the time spans needed for correction with the available DGPS error correction files, the auto-selection program determines which error correction files of the available files should be used. The auto-selection program is optimized to look at files ending with the suffixes ".SSF" and ".DAT" first. Furthermore, the auto-selection program rejects rover data files that look similar to DGPS error correction files.

If the auto-selection program determines that there is some duplicate coverage, then the auto-selection program can make a suggestion as to which error correction files are most suitable. The results of the comparison is reported to the user. The comparison results may indicate full matches, no matches or partial matches. The user can proceed with the DGPS correction if appropriate.

Combination embodiment

A third and preferred embodiment of an auto-selection program, is an auto-selection program that combines the two previous systems. The combined embodiment first generates a set of file names that should contain the desired DGPS error correction information as described in the first embodiment. The auto-selection program then looks for those files. If the desired DGPS error correction information is found in the designated set of file names, then the DGPS error correction is performed.

However, if the desired DGPS error correction information is not found using the designated set of file names, then the combined embodiment of the auto-selection program examines all the files in the nominated directory looking for a DGPS error correction file that contains DGPS error correction information for the desired time span as described in the file scan embodiment.

Thus, the combined embodiment combines the aspects of the DGPS file name generation embodiment and the DGPS file scan embodiment. Using the combined embodiment, a user does not need to know the names of the DGPS files or the naming system that is used. The user merely selects a directory that should contain the DGPS files. If the user is unsure of the proper directory, then the user can select the root directory such that the combined embodiment will recursively search through the entire file system looking for the desired DGPS error correction file.

Automated DGPS Correction Using FTP Protocol

The present invention introduces an automated method that simplifies the post-processing of GPS information from a rover GPS unit with differential GPS error correction data from a base station. To take advantage of the automated system, the rover GPS unit containing the uncorrected GPS data must be connected to a computer network that is coupled to a server that contains DGPS error correction information from a base station. Referring to FIG. 1, the base stations 101 and 105 store their DGPS error correction files on computer file servers coupled to a computer network 120. In one embodiment the computer network 120 is the global Internet, however any type of computer network can be used.

Figure 2:
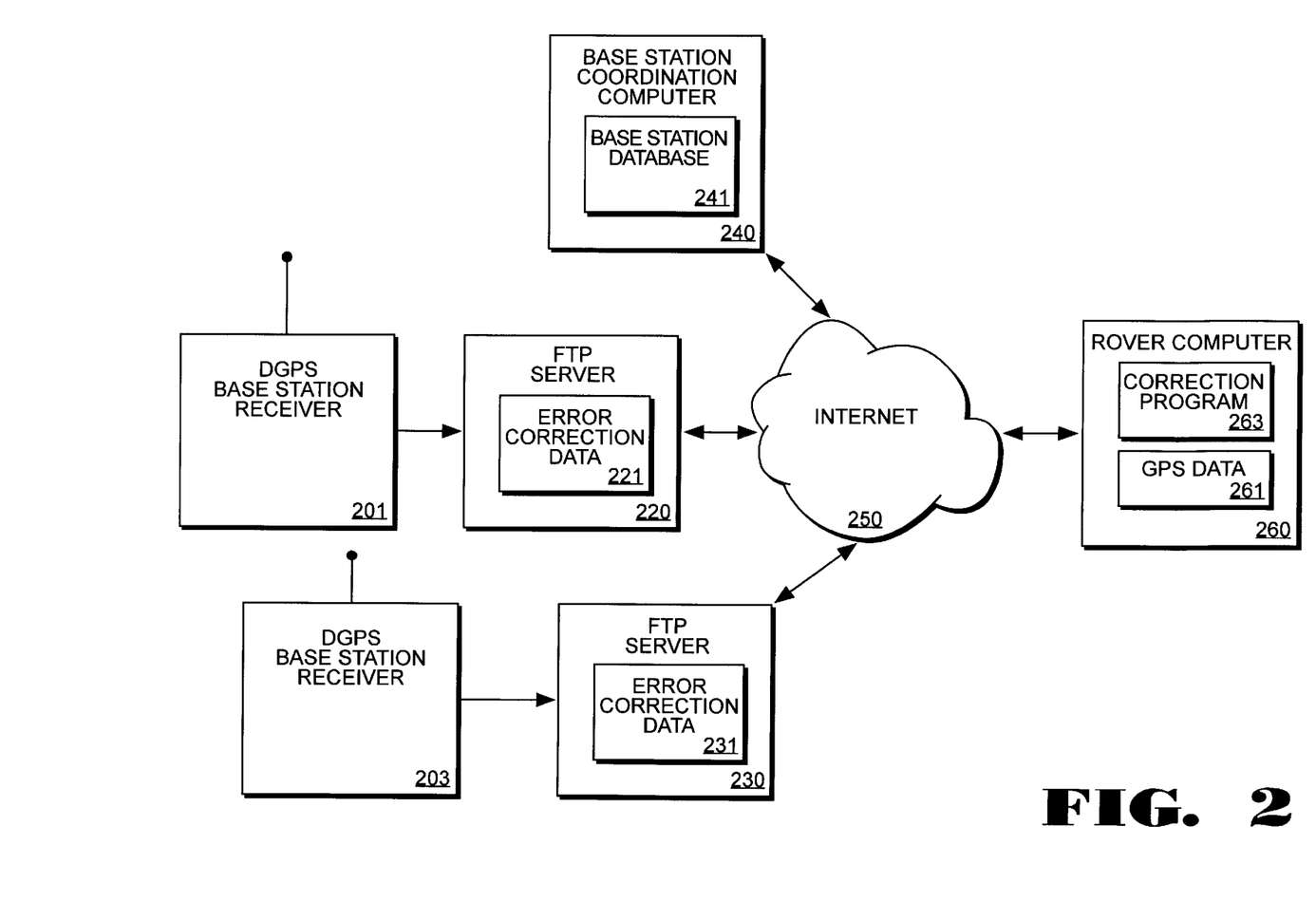
FIG. 2 illustrates a computer arrangement for automatically retrieving differential GPS correction information over the global Internet using ftp protocol.

FIG. 2 illustrates a first computer arrangement for automatically obtaining error correction data files from base stations using a rover GPS computer unit 260. The rover GPS computer unit 260 may be a GPS receiver that directly receives GPS information from satellites or it may be a computer system that receives GPS information from a separate dedicated GPS receiver. In either case, the rover GPS computer unit 260 contains uncorrected GPS data files 261. The uncorrected GPS data files 261 are time-stamped with dates and times when the position information was collected.

The rover GPS computer unit 260 is connected to the global computer Internet 250 such that the rover GPS computer unit 260 can communicate using the TCP/IP protocol. To control the correction of the uncorrected GPS data 261, a user runs a DGPS correction program 263 on the rover GPS computer unit 260.

Also coupled to the computer network 250 are a pair of File Transfer Protocol (FTP) servers 220 and 230 that store error correction data files 221 and 231. The error correction data files 221 and 231 are generated by accompanying differential GPS base station receiver units, 201 and 203. Each differential GPS base station receiver generates error correction files and that are stored in an accompanying FTP server such that the error correction files are available to any other computer coupled to the network.

Figure 3A:
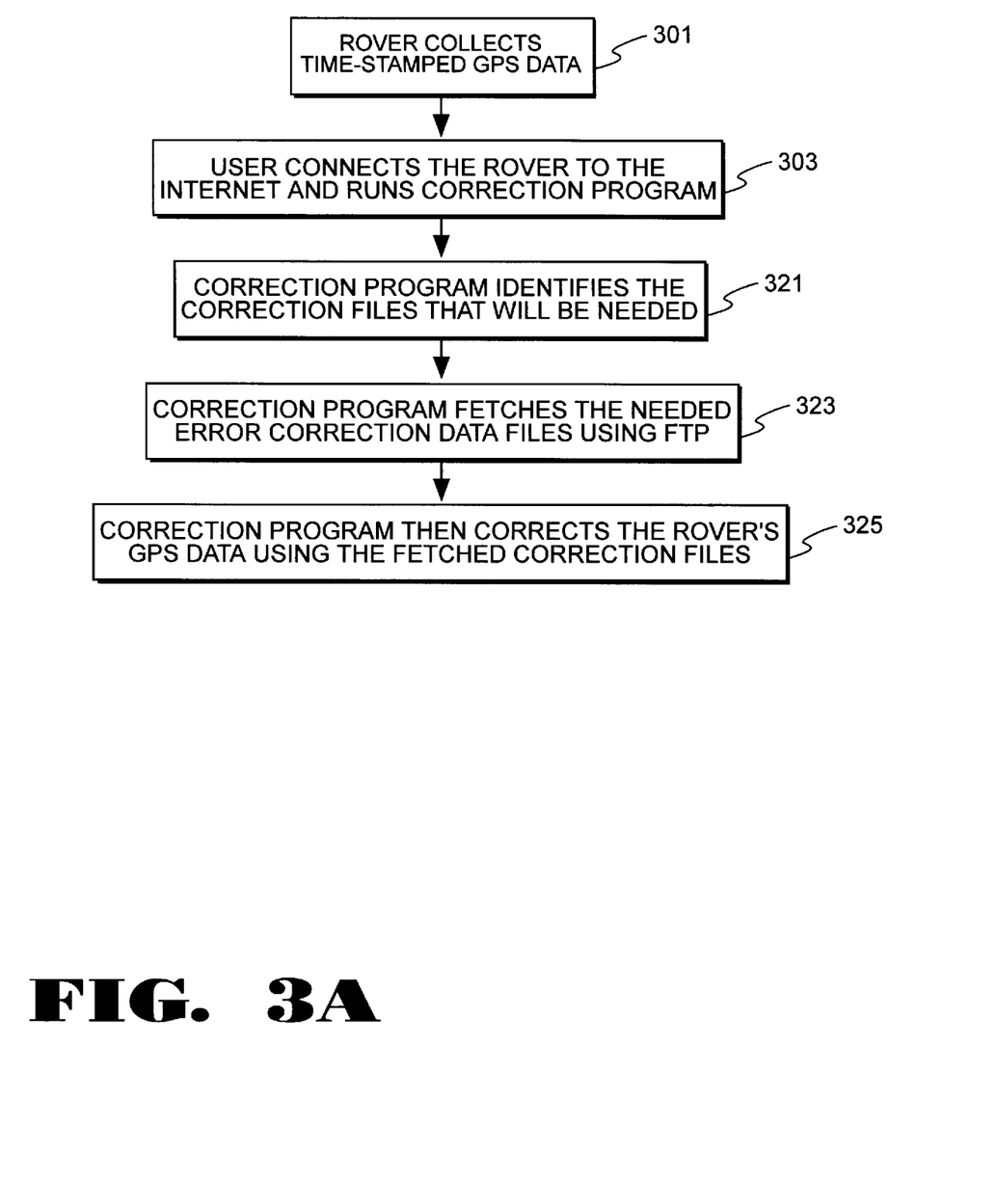
FIG. 3a illustrates a first flow diagram of steps for automatically correcting GPS positions using differential GPS correction information retrieved over the global Internet using the File Transfer Protocol (FTP).

FIG. 3a lists a series of steps performed to correct GPS data retrieved on a rover unit. The first step, 301, is for the rover GPS unit to collect GPS information. The rover GPS computer unit stores the GPS information in a file with time-stamps that are synchronized with Universal time. At step 303, the user connects the rover GPS computer unit to the global Internet. Alternatively, a user may download GPS information from a small, handheld rover GPS unit into a computer that is connected to the global Internet. Referring back to FIG. 2, to improve the accuracy of the uncorrected GPS information 261, the user runs the error correction program 263 on the rover GPS computer 260. The DGPS correction program 263 then takes control and automatically performs the remaining steps to correct the uncorrected GPS information 261.

Referring to step 321 of FIG. 3a, the DGPS correction program 263 first examines the uncorrected GPS information 261 on the rover personal computer to determine the start and end times when the GPS information was collected, in Universal time. The start time is then used to generate an error correction file name as taught in the previous section on automated DGPS correction file selection. If the end time is not within the same hour as the start time, then one or more subsequent error correction file names must also be generated.

After the DGPS correction program 263 identifies the names of the error correction files that will be needed, then at step 323 the DGPS correction program 263 fetches the needed error correction files from the appropriate server. In one embodiment of the invention, the error correction files are fetched by performing a File Transfer Protocol (FTP) "get" operation which fetches the error correction files from an FTP server connected to the Internet. To pay for the operation of the base station, the provider of the base station correction information may restrict access to the FTP server to nominated user names and passwords. This provides a mechanism for restricting access to bona fide subscribers or tracking usage for billing purposes. The provider may then later send a bill to the users that access the DGPS FTP server.

After having obtained the error correction data files, the DGPS correction program 263 then corrects the GPS data received by the rover unit using the retrieved error correction files. Before using the retrieved error correction files, the DGPS correction program 263 may need to decompress the error correction file. Error correction files are often stored in compressed form to reduce the long term storage requirements and reduce file transmission time. Thus, the post-processing error correction operation was performed automatically and without any need for user intervention.

In order to most accurately correct the GPS information received from a rover GPS receiver, the base station generating the differential GPS correction files should be located relatively close to where the rover GPS receiver is obtaining data. As illustrated in FIG. 1, there may be more than one base station receiver in the area where the rover GPS unit is taking position observations. To most accurately correct the rover data, the rover should obtain error correction information from the closest base station unit. Alternatively, the correction information from a number of nearby base stations may be averaged together to obtain a measure of precision.

Figure 3B:
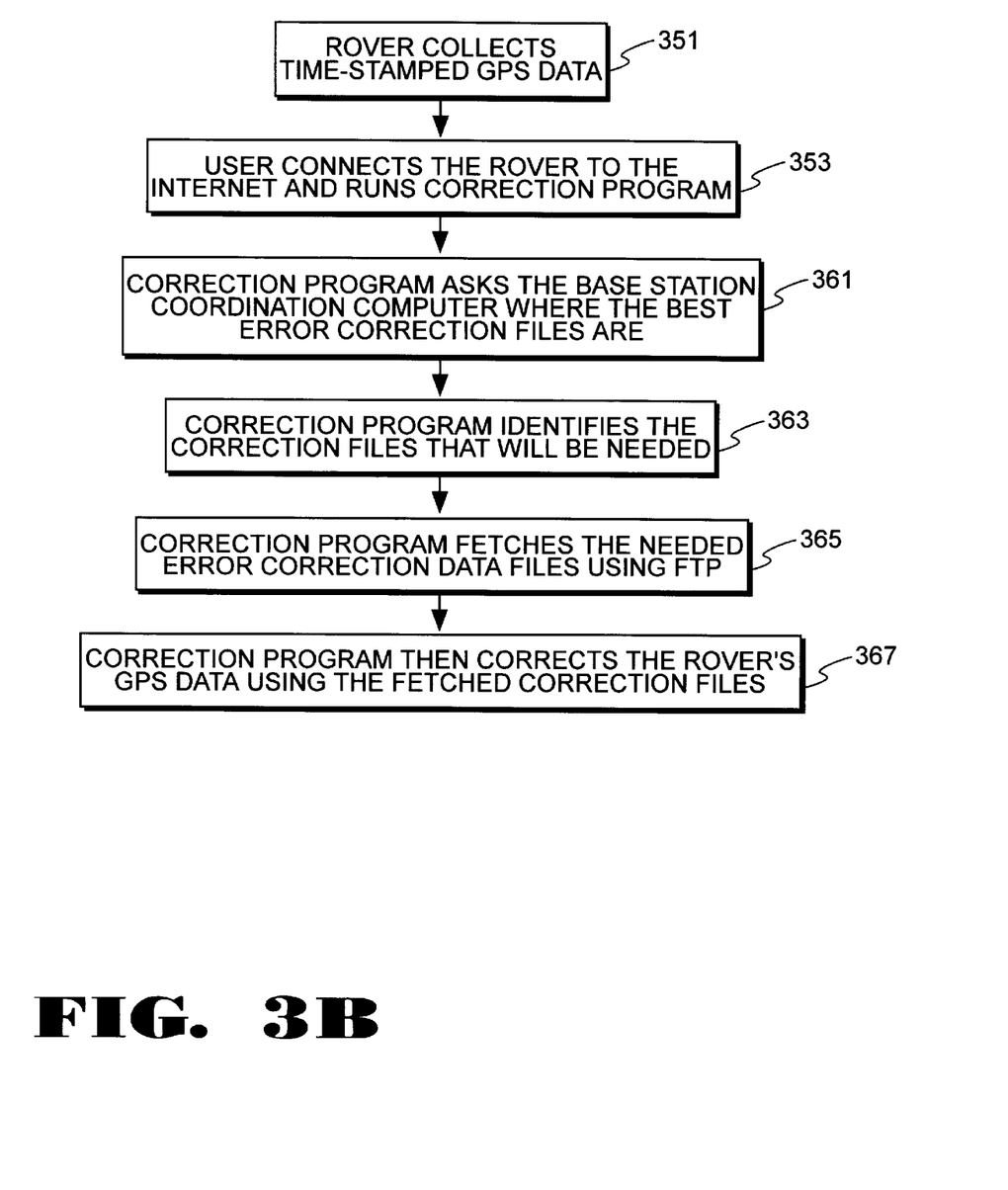
FIG. 3b illustrates a second flow diagram of steps for automatically correcting GPS positions using differential GPS correction information retrieved over the global Internet using the File Transfer Protocol (FTP).

FIG. 3b illustrates the steps of an improved method of automatically correcting the GPS data that ensures the best differential GPS information is used. Referring to FIG. 3b, the first step is to have the rover unit collect time-stamped GPS information. Next, at step 353, the user connects the rover GPS unit to the global Internet. Again, the user may simply download the GPS information to a computer connected to the Internet. The user then runs the DGPS correction program 263 which then takes over the correction process.

The DGPS correction program 263 then examines the uncorrected GPS files that the user wishes to have corrected.

Specifically, the DGPS correction program 263 determines when the rover GPS unit collected data and where it was at the time. Next, the DGPS correction program 263 contacts a base station coordination computer that has records of all the error correction data that is available. Referring to FIG. 2, the rover computer 260 contacts base station coordination computer 240 and queries the base station database 241. Using the approximate position from the uncorrected GPS rover information, the DGPS correction program 263 asks the base station coordination computer 240 for the address of a server that has the DGPS correction information from the closest base station. The base station coordination computer provides the address of the FTP server with the DGPS correction information from the closest base station. The base station coordination computer may also provide a filename that should be accessed to obtain the desired DGPS error correction information.

If no file name was sent by the base station coordination computer, then the DGPS correction program 263 on the rover computer then generates the file names of the correction data that will be needed. As previously stated, the file names are generated using the time when the uncorrected GPS information was collected.

After having received or generated one or more file names, the correction program fetches the needed correction error files from the server that was specified by the base station coordination computer. As previously stated, the FTP server may log the access and later send a bill to the user for accessing the DGPS error correction files. Finally, the DGPS correction program 263 corrects the GPS rover data used in the error correction files at step 367.

Automated DGPS Using HTTP Protocol
HTTP Background

The fastest growing protocol on a global internet is the HyperText Transport Protocol (HTTP). HTTP is the protocol that is used by the World Wide Web. Using the HTTP protocol, any program connected to the Internet with a properly-equipped browser program can obtain and view text, image, sound and animation files from HTTP servers anywhere on the global Internet.

Due to the popularity of the HTTP protocol, innovation and advancement in the area of HTTP protocol has been very rapid. For example, forms, tables, authentication, and the ability to perform secure transactions have all been added to the HTTP protocol. Furthermore, the server software and client software is being developed and maintained by several large software corporations such that the long term survival of the HTTP protocol is ensured. Since the HTTP protocol is so popular and well supported, it is a desirable environment to implement an automated differential GPS system.

File-based embodiment

Figure 4:
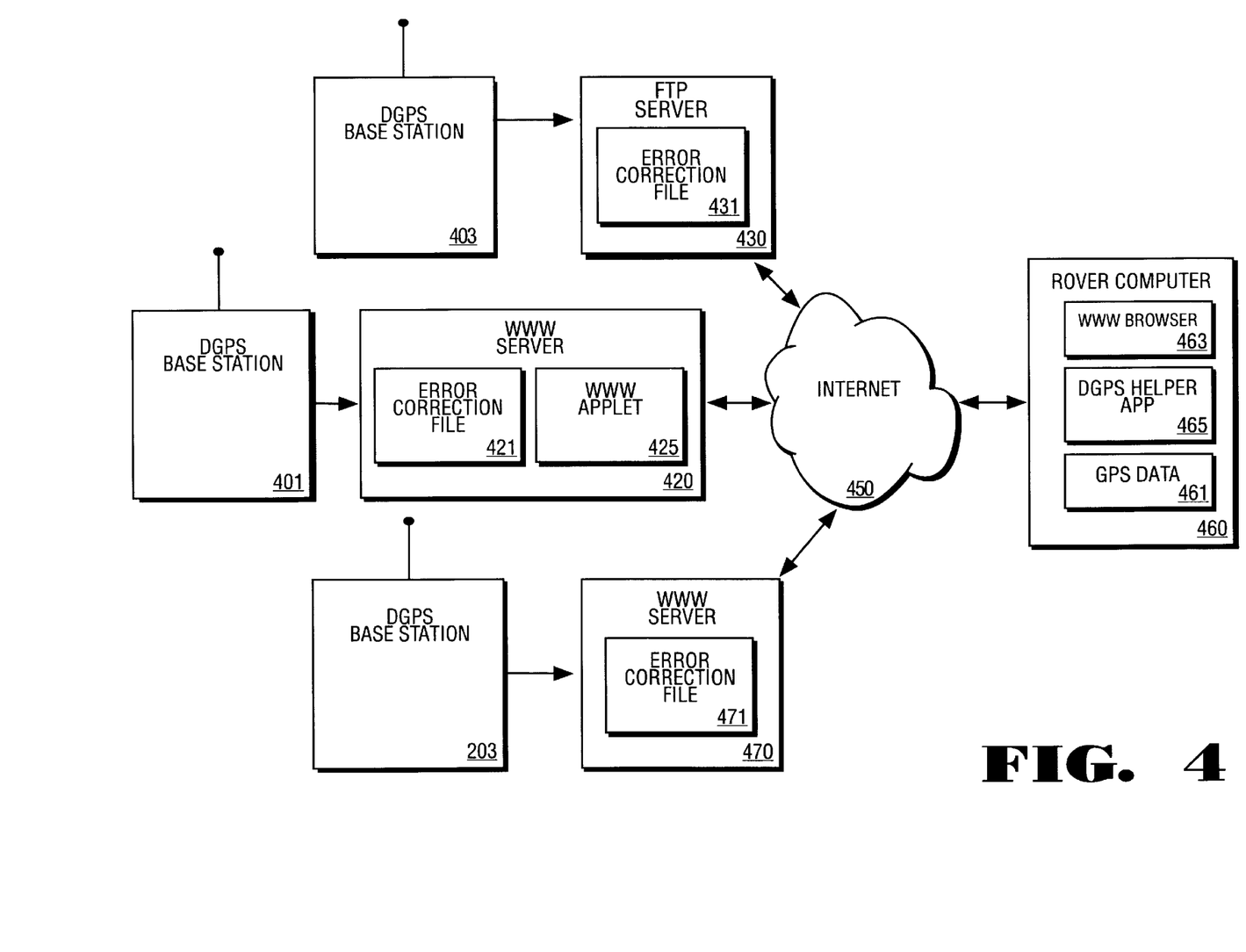
FIG. 4 illustrates a computer arrangement for automatically retrieving differential GPS correction information over the global Internet using the HyperText Transport Protocol (HTTP).
Figure 5:
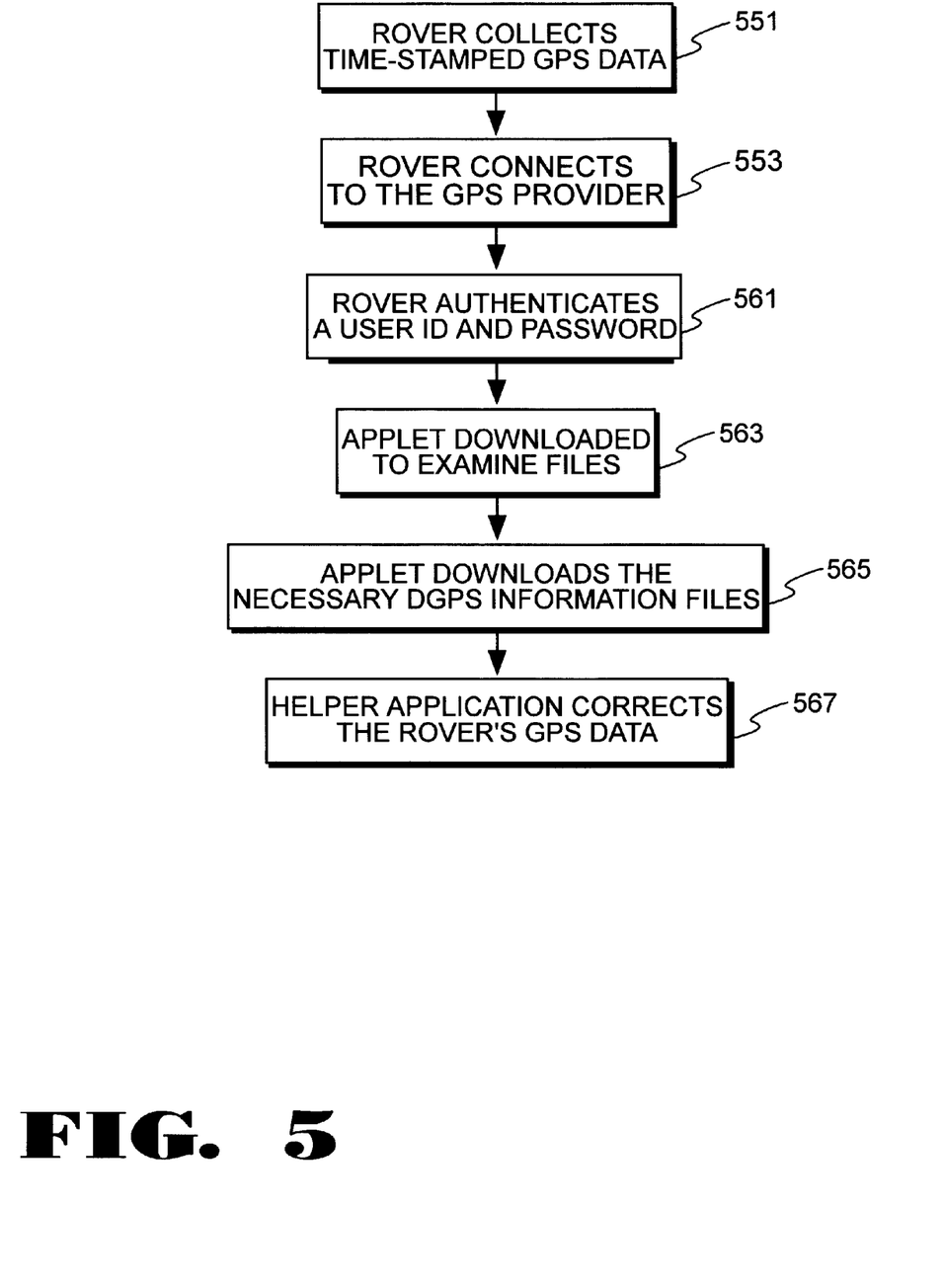
FIG. 5 illustrates a flow diagram of steps for automatically correcting GPS positions using differential GPS correction information retrieved over the global Internet using the HyperText Transport Protocol (HTTP).

FIGS. 4 and 5 illustrate one embodiment of an automated differential GPS delivery system that uses the HTTP protocol. The embodiment illustrated in FIGS. 4 and 5 uses error correction files as described in the previous section.

Referring to FIG. 4, the rover GPS computer 460 is coupled to the Internet 450. To access the World Wide Web, the rover GPS computer 460 has a World Wide Web browser program 463. Using the World Wide Web browser program 463, a user can access a DGPS World Wide Web server such as DGPS World Wide Web server 420 across the Internet. The user can then download the error correction information such a helper applet 425 will perform the error correction. In an alternate embodiment, a dedicated DGPS error correction program communicates directly with the DGPS World Wide Web server 420 via the HTTP protocol. In the alternate embodiment, the World Wide Web browser program 463 and the supporting applet are not necessary since their functions are performed by the dedicated DGPS error correction program.

FIG. 5 illustrates a flow chart of the steps performed to automatically correct GPS data using DGPS correction information. As in the earlier case, the first two steps are to collect the GPS information and then connect the rover GPS computer 460 to the Internet 450. At step 553, the user runs a World Wide Web browser program 463 to access a DGPS World Wide Web server 420. The World Wide Web browser program 463 then displays a web page from the DGPS World Wide Web server 420.

Using the graphical interface World Wide Web browser program 463, the user indicates that he wishes to correct some GPS data. When the user makes this selection, the DGPS World Wide Web server 420 may ask the user to identify himself with a user identifier and a password at step 561. All subsequent accesses can then be logged such that a bill may be generated at a later point.

After authenticating the user, the DGPS World Wide Web server 420 sends a DGPS World Wide Web Applet 425 to the rover GPS computer 460 at step 563. The DGPS Applet 425 is a small program that examines the uncorrected GPS information 461 in the rover GPS computer 460. The DGPS Applet 425 may be written in JAVA or a similar applet language. The DGPS Applet 425 examines the uncorrected GPS information 461 to determine when the GPS information was collected and an approximate position of where the information was collected. The DGPS Applet 425 returns this position and time information back to the DGPS World Wide Web server 420.

Using the time and position information, the DGPS Applet 425 consults with the DGPS World Wide Web server 420 to determine the DGPS corrections files that will be needed. The DGPS World Wide Web server 420 may use the DGPS file name generation method, the DGPS file scan method, or the combined method to located the needed DGPS error correction file or files. Once the proper DGPS error correction files have been determined, the DGPS Applet 425 then downloads the proper DGPS error correction files at step 565.

The DGPS error correction files may reside anywhere on the Internet. For example, the error correction file may be located on the FTP server 430, on the World Wide Web server 420, or on another World Wide Web server 470. Once the error correction files have been received by the rover GPS computer 460, the World Wide Web browser on rover GPS computer 460 recognizes the ".SSF" extension (or other DGPS extension) on the end of the error correction file and invokes an appropriate differential GPS helper application 465 at step 567. The differential GPS helper application then takes over the error correction process. That is, the differential GPS helper application rover GPS computer 460 combines the uncorrected GPS information 461 with the error correction files that have been retrieved and corrects the uncorrected GPS information 461.

In an alternate embodiment, the World Wide Web browser on rover GPS computer 460 passes the DGPS error correction information to a "plug-in" application that helps the World Wide Web browser interpret and display the DGPS error correction information. Specifically, the plug-in application uses the DGPS error correction information to correct the GPS coordinates from a rover GPS file.

Streaming or packet embodiment

In an alternate embodiment of an automated DGPS error correction system, the DGPS error correction information is not transmitted in hour length files. In the alternate embodiment, the start and end times are transmitted to the server that stores the DGPS error correction information. The server then begins streaming the DGPS error correction information to the requester.

To use the streamed DGPS error correction information, a "plug-in" program that helps the World Wide Web browser interpret and display the DGPS error correction information is used. The World Wide Web browser provides the streamed information to the plug-in DGPS error correction program and that plug-in program performs the DGPS error correction. Alternatively, a single DGPS error correction program can be designed to send and receive information using the HTTP protocol. This stand-alone DGPS error correction program would not require the help of a World Wide Web browser program.

By implementing a streaming version of the DGPS error correction system, only the required DGPS error correction information is retrieved. For example, if only five minutes of GPS information was collected, then only a corresponding 5 minutes of DGPS error correction information would be retrieved. Thus, the streaming version uses network bandwidth more efficiently than a file based DGPS error correction system.

Near Real-Time Differential GPS Correction

To achieve near real-time differential GPS correction, the rover computer must be coupled directly to the Internet while it is receiving position data. With the advent of new wireless communication systems, this will be possible using standardized technology. For example, Metricom of Los Gatos, Calif. offers a wireless Internet service know as "Ricochet". The Ricochet wireless Internet service replaces the standard telephone modem with a wireless modem designed for Metricom's wireless digital network. Due to the increasing popularity of the Internet, such wireless Internet service can now be obtained at very inexpensive prices in certain areas. For example, wireless Internet service can be obtained for less than $30 per month in California's Silicon Valley.

Server to Rover embodiment

Figure 6:
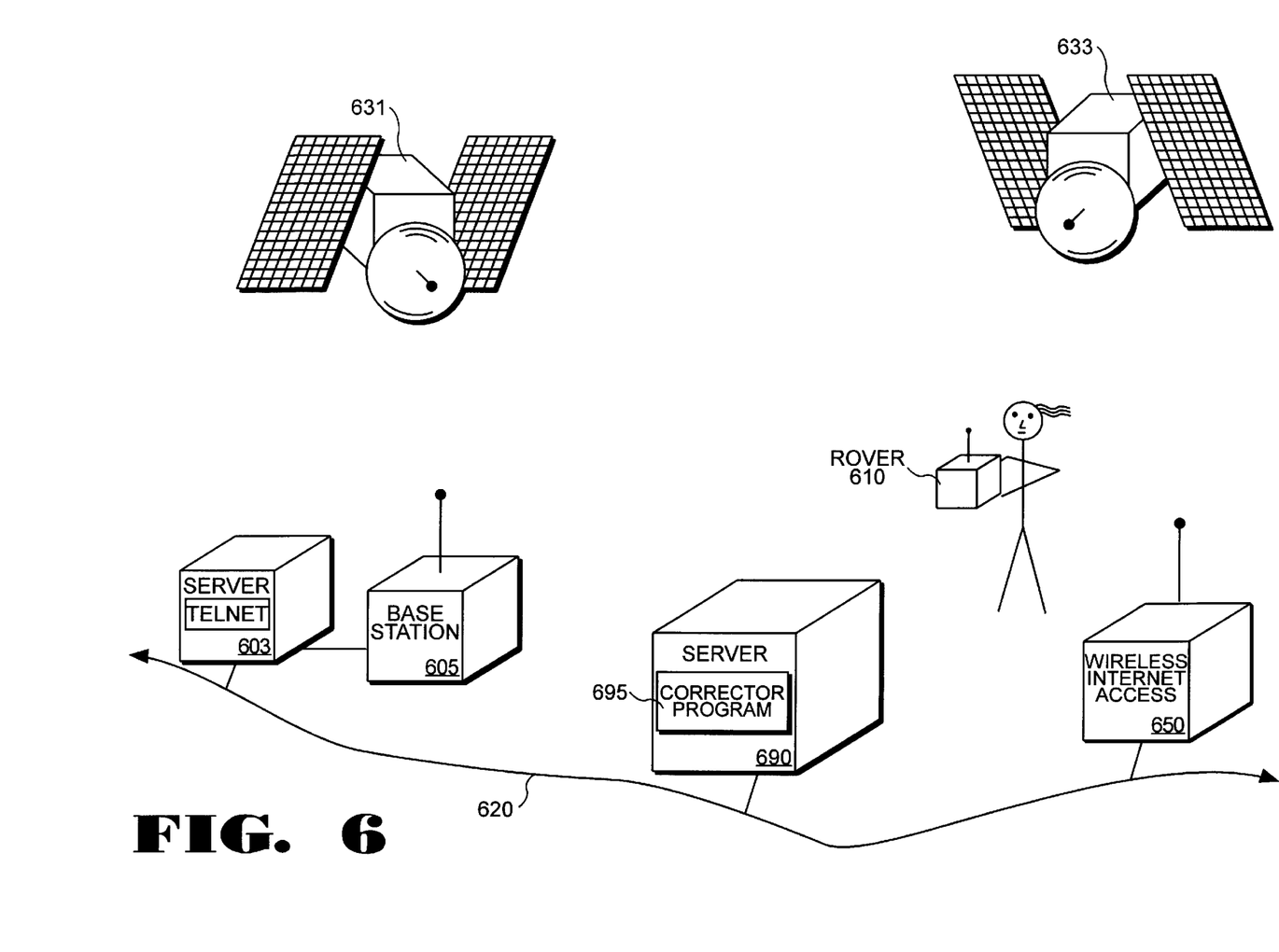
FIG. 6 illustrates a rover GPS unit being used to collect position data and a base station being used to correct the GPS errors using near real-time correction.

FIG. 6 illustrates one embodiment of a system that allows near real-time correction of GPS information using a wireless internet connection such as Ricochet by Metricom. Thus, the rover GPS unit 610 must be capable of receiving GPS information from satellites and communicating with a wireless Internet access server 650. The wireless Internet access server 650 provides access to the Internet 620. A DGPS corrector program running on the rover GPS unit 610 controls the DGPS correction.

The DGPS corrector program accesses a Telnet server 603 that is connected to a differential GPS base station 605. The Telnet server 603 receives the DGPS error correction data that is continually being generated by the differential GPS base station 605. Once the GPS corrector program connects to the Telnet server 603, the GPS corrector program runs a program on the Telnet server 603 that provides a continuous feed of the correction information as it is generated.

The GPS corrector program combines the error correction data received from the Telnet server 603 with the GPS information that is generated by the rover GPS unit 610. Due to communication delays, the rover GPS unit 610 will likely need to maintain delay buffers for both the GPS information generated on the rover GPS unit 610 and the error correction data received from the Telnet server 603. The two data streams are matched up using time-stamps. Since the DGPS correction is not instantaneous, it is termed "near real-time DGPS error correction."

Rover to Server Embodiment

Instead of having the Server transmit the error correction data to the rover GPS unit 610, the data transmission path can be reversed such that the rover GPS unit 610 transmits the uncorrected GPS position information directly to a server. The Server may be same server used to obtain DGPS error correction information (such as server 603) or the server may be any other server connected to the Internet such as server 690 with DGPS error corrector program 695. The server that receives the uncorrected GPS position information from the rover can perform the DGPS error correction. Thus, the rover GPS unit 610 can be a very inexpensive DGPS receiver system that merely transmits the uncorrected GPS position information to a server. The server then has the responsibility of locating the proper DGPS error correction information and performing the DGPS error correction calculations.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A method of near real-time Differential Global Positioning System (DGPS) error correction, said method comprising:

generating DGPS error correction information on a DGPS base station having a known location;

transmitting DGPS error correction information to a server coupled to said base station;

receiving Global Positioning System (GPS) information on a rover GPS unit, said rover GPS unit having a wireless connection; and processing said GPS information with said DGPS error correction information.

2. The method of claim 1, wherein said rover GPS unit communicates with a wireless server.

3. The method of claim 2, wherein said wireless server comprises a wireless link to an Internet access port.

4. The method of claim 1, wherein the step of processing is performed on the server, said method further comprising the steps of said rover GPS unit transmitting said GPS information to the server using the wireless connection.

5. The method of claim 1, wherein the step of processing is performed on the rover GPS unit, said method further comprising the steps of said rover GPS unit receiving said DGPS error correction information using the wireless connection.

6. A method of near real-time Differential Global Positioning System (DGPS) error correction, said method comprising:

generating DGPS error correction information on a DGPS base station having a known location;

transmitting said DGPS error correction information to a server coupled to the base station;

streaming said DGPS error correction information to a rover Global Positioning System (GPS) unit wirelessly coupled to the server;

receiving GPS information on said rover GPS unit;

processing said GPS information with said DGPS error correction information.

7. The method of claim 6, wherein the server comprises a wireless link to an Internet access port.

8. A system comprising a rover Global Positioning System (GPS) unit configured to receive GPS information and transmit wirelessly the GPS information to a server which is configured to receive Differential GPS (DGPS) error correction information from a base station of a known location and process the GPS information with the DPGS error correction information.

9. A system comprising a rover Global Positioning System (GPS) unit configured to receive GPS information and Differential GPS (DGPS) error correction information and process the GPS information with the DPGS error correction information, said rover GPS unit configured to receive DGPS error correction information wirelessly from a DGPS server coupled to a base station with a known location.

10. A system comprising a Differential Global Positioning System (DGPS) server configured to be coupled to a base station and a rover Global Positioning System (GPS) unit, said base station configured to provide DGPS error correction information to the DGPS server, said DGPS server configured to wirelessly communicate with said rover GPS unit such that said GPS information is processed with the DGPS error correction information.

11. The system as set forth in claim 10, wherein said server is further configured to receive the GPS information from the rover GPS unit through a wireless connection and process the GPS information with the DGPS error correction information.

12. The system as set forth in claim 10, wherein the server is further configured to transmit the DGPS information to the rover GPS unit through a wireless connection.

13. The system as set forth in claim 10, wherein the server comprises a wireless link to an Internet access port.

* * * * *